United States Patent [19]

Van Zeeland et al.

[11] 3,878,435

[45] Apr. 15, 1975

[54] DORMANT OSCILLATOR GROUND TO NEUTRAL PROTECTION FOR GROUND FAULT INTERRUPTERS

[75] Inventors: Donald L. Van Zeeland, Franklin; Russell P. Schuchmann, Racine, both of Wis.

[73] Assignee: Cutler-Hammer, Inc., Milwaukee, Wis.

[22] Filed: Jan. 21, 1974

[21] Appl. No.: 434,988

[52] U.S. Cl. .......... 317/18 D; 317/27 R; 317/33 SC
[51] Int. Cl. .............................................. H02h 3/28
[58] Field of Search ............ 317/18 D, 27 R, 33 SC

[56] References Cited
UNITED STATES PATENTS

| | | | |
|---|---|---|---|
| 3,737,726 | 6/1973 | Tarchalski | 317/18 D |
| 3,800,189 | 3/1974 | Montz | 317/18 D |
| 3,813,579 | 5/1974 | Doyle et al. | 317/18 D |

Primary Examiner—James D. Trammell
Attorney, Agent, or Firm—H. R. Rather; Wm. A. Autio

[57] ABSTRACT

Ground to neutral fault protection employing dormant oscillators which are only energized and function on the occurance of such type of a ground fault. Combined with known types of two and three wire single phase AC ground fault interrupters to provide circuit interruption regardless of which wire is faulted to ground.

6 Claims, 4 Drawing Figures

3,878,435

DORMANT OSCILLATOR GROUND TO NEUTRAL PROTECTION FOR GROUND FAULT INTERRUPTERS

BACKGROUND OF THE INVENTION

The present invention relates to ground fault interrupters which are sensitive to low resistance faults occurring between neutral conductors in an A.C. distribution circuit and ground.

National and local code standards require that ground fault interrupters used to protect grounded neutral, two and three wire A.C. distribution circuits function to interrupt the supply of power to such distribution circuit on occurence of a low resistive ground fault between any electrified or neutral line and ground. All prior systems used for detecting the presence of a fault between ground and a neutral line have employed circuits which are continuously energized. These have taken the form of circuits energized by transformer or inductive windings connected between the distribution lines, or by circuits that require active high frequency superimposed voltages that are interrupted or otherwise attenuated when such ground faults occur. Such circuits are subject to influence by transient currents, and in the case of high frequency superimposed voltages the entire distribution system is subjected to these signals which may be highly objectionable in some instances.

OBJECTS OF THE INVENTION

It is a primary object of the present invention to provide an improved form of neutral-to-ground fault protection system which under normal conditions is dormant and thus superimposes no unwanted signal on a protected distribution circuit yet immediately detects and responds to neutral-to-ground faults.

Another object of the invention is to provide a ground fault protection system of the aforementioned type that employs a dormant oscillator which is triggered into oscillation to initiate disconnection of the protected distribution circuit upon occurance of a neutral-to-ground type of fault.

A further object of the invention is to provide ground fault protection of the aforementioned type which can be readily combined with known types of ground fault interrupters which normally function upon occurance of a fault between electrified lines and ground.

Other objects and advantages of the invention will hereinafter appear.

DESCRIPTION OF THE PREFERRED EMBODIMENT

Figure 1:
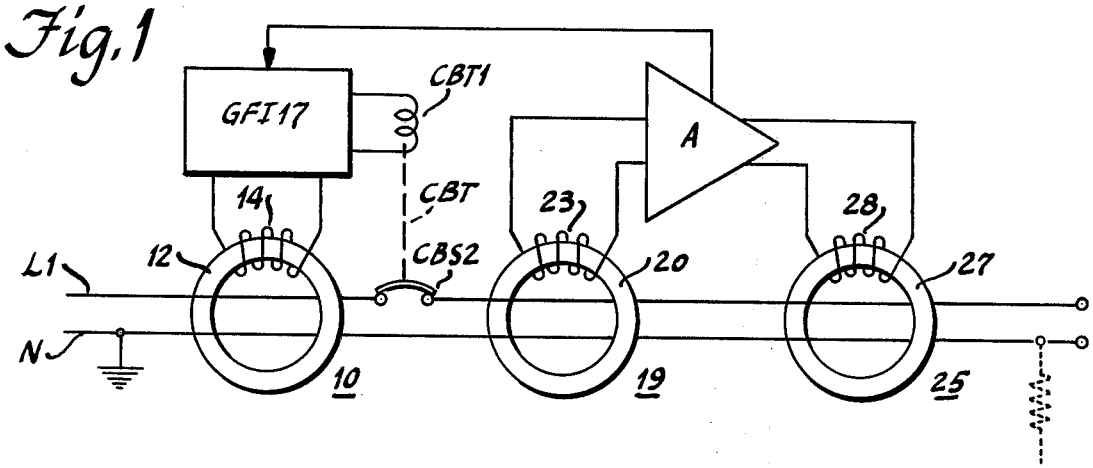
FIG. 1 is a schematic diagram of one embodiment of the present invention.

FIG. 1 shows the basic form of the invention as applied to a single phase alternating power circuit comprising to a conductors or lines designated L1 and N. Line N, the "neutral" wire, has connection to earth ground and line L1 carries an alternating voltage with respect to line N and is termed the "electrified" wire. Lines L1 and N may be assumed to be connected at their left hand ends to a source of single phase, alternating current and at their right hand ends to a load or to several loads connected thereacross in parallel.

Lines L1 and N pass through the cores of 12, 20 and 27 of three differential transformers 10, 19 and 25, respectively, and each line provides a primary winding for each of these transformers. The core 12 of transformer 10 has a secondary winding 14 wound thereon and the ends thereof are connected to the input side of a ground fault interrupting circuit 17 which has an output connected to the coil CBT1 of a circuit breaker CBT which has contacts CBS2 in circuit with line L1. In one preferred form GFI 17 is like that disclosed in the Van Zeeland et al., application Ser. No. 345,731, filed Mar. 28, 1973 and assigned to the assignee of this application. As therein disclosed, upon occurance of a ground fault between line L1 and ground, GFI 17 will immediately respond to energize CBT1 to cause opening of contacts CBS2 and effect disconnection of the loads from the alternating current source.

The core 20 of transformer 19 has a secondary winding 23 which has its ends connected to the input terminals of an amplifier A, and the core 27 of transformer 25 has a secondary winding 28 connected to other input terminal of amplifier A. The output of amplifier A is connected to a third input terminal of GFI 17. Let it be assumed that a fault from neutral wire N to earth occurs, as indicated by the broken lines, and that such fault has a resistance on the order of 4 ohms or less. It will be observed that line N together with the ground return provides a means for coupling the windings of transformers 19 and 25. Thus it can be seen that the circuit can now oscillate provided the loop gain is equal to or exceeds unity. With the output voltage of windings set in proper phase relation, amplifier A will provide a suitable output voltage which causes the GFI 17 to respond to energize winding CBT1 and trip open contact CBS2. Transformer 19 and 25 and amplifier A thus act as a "dormant oscillator" and only oscillate to provide a GFI tripping output voltage when a neutral-to-ground fault occurs.

Figure 2:
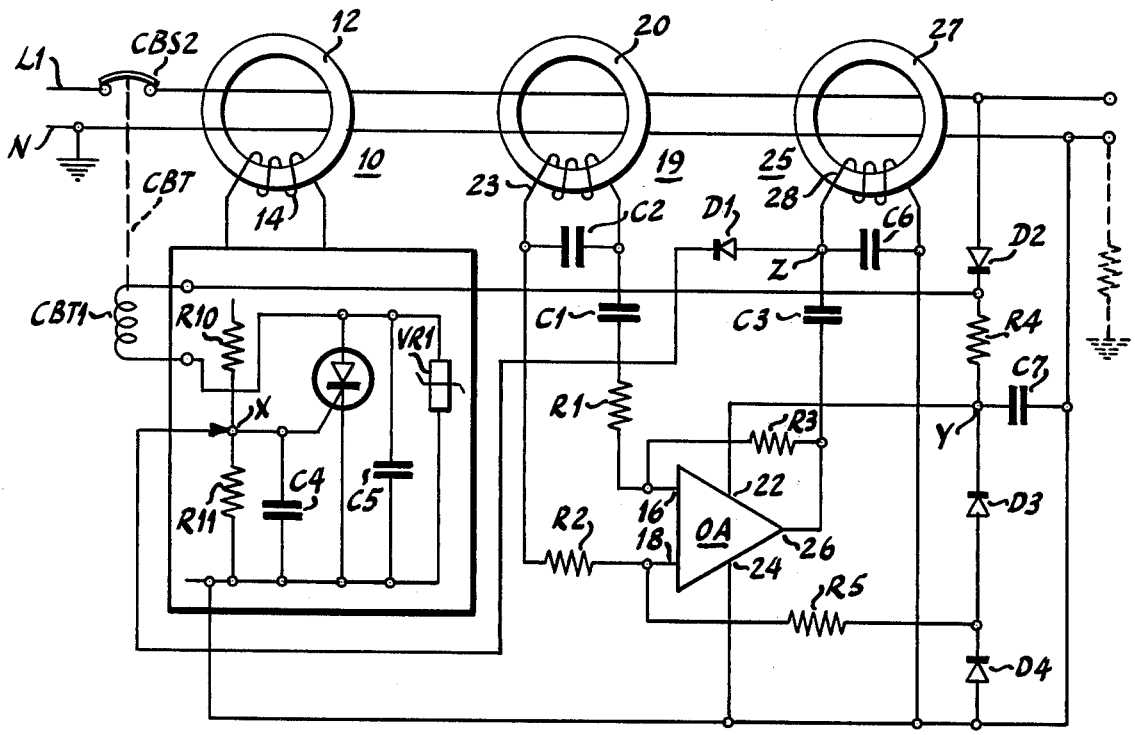
FIG. 2 is a more complete diagram of the embodiment of the invention.

FIG. 2 is a more complete detailed study showing of a preferred embodiment of the circuit briefly disclosed in FIG. 1. The portion of the actual circuitry in GFI 17 actually involved is described, and for sake of clarity the elements thereof bear the same reference numerals as corresponding elements in the preferred form disclosed in the aforementioned Van Zeeland application. The right hand end of secondary winding 23 of transformer 19 is connected in series with a capacitor C1 and a resistor R1 to the inverting input terminal 16 of an operational amplifier OA, and the left hand end of winding 23 is connected in series with a resistor R2 to the non-inverting input terminal 18 of amplifier OA. A capacitor C2 is connected across winding 23. The output terminal 26 of amplifier OA is connected in series with a coupling capacitor C3 to the point Z which is common to the left hand end of secondary winding 28 of transformer 25, the anode of a diode D1 and the left hand plate of a capacitor C6 that is connected across winding 28.

The output terminal 26 of amplifier OA is also connected in series with a feed-back resistor R3 to the inverting input terminal of the amplifier. A source of D.C. potential is provided by a series connection of a diode D2, resistor R4, and diode D3 and D4 connected across the lines L1 and N as shown. A filter capacitor C7 is connected between the point Y common between resistor R4 and D3 and line N. The positive D.C. bias terminal 22 of amplifier OA is connected to the point Y and may be assumed to be subject to a D.C. bias to + 20 volts. A resistor R5 is connected from the point common between diodes D3 and D4 and the non-inverting input terminal 24 of amplifier OA. The ground terminal is connected to line N. The point X is connected through diode D1 to the point common between resistors R10 and R11, and the gate of SCRQ1 of GFI 17.

Let it be assumed that alternating load current is flowing normally through lines L1 and N and no ground fault is occuring between either of these lines and ground. Thus differential transformer 10, 19 and 25 will not develop any ampere turns in the respective secondary winding 14, 23 and 28. Amplifier OA will under these conditions develop a quiescent D.C. output potential of 10 volts. Capacitor C3 blocks the flow of D.C. current. No voltage exists across winding 28 and consequently no current will flow through diode D1.

Now let it be assumed that a ground fault represented by the phantom resistor occurs between line N and ground. It will be appreciated that a ground current circuit will then be completed which includes ground and conductor N, and such ground current causes ampere turns to be developed in each of the windings 23 and 28 of the transformer 19 and 25. The input of the inverting and non-inverting input terminals 16 and 18 of amplifier OA are then subjected to an A.C. potential and amplifier OA then develops an alternating potential of increasing magnitude. The increased current flow thru capacitor C3 re-inforces the A.C. current generated in the tank circuit comprising winding 28 and capacitor C6. Consequently an oscillatory potential having a frequency determined by the tank circuit components is developed which increases abruptly in magnitude. Such A.C. potential across the tank is detected by diode D1, and when it increases to a sufficient magnitude, firing of silicon controlled rectifier SCRQ1 in the GFI 17 unit occurs. Firing of SCRQ1 in turn causes energization of winding CBT1 of the circuit breaker which responds to open the contacts CBS2 in line L1. This oscillatory action occurs within a millisecond when the neutral-to-ground fault resistance is sufficiently low to cause oscillation in the circuit.

The combination of the transformers 19 and 25, amplifier OA and the components directly associated therewith, in effect, provide a dormant oscillator, With no neutral-to-ground fault occurring no oscillatory current is developed, but upon occurance of such a ground fault, an oscillator current of a magnitude sufficient to cause energization of the circuit breaker CBT occurs. It is thus quiescent under normal conditions and obviates need for continuous high frequency currents to function. It is immune to transient currents on lines L1 and N, and will only function when a completed ground circuit inclusive of line N is developed. Moreover, if a ground fault develops between line L1 and ground, this circuit remains dormant, and the other ground fault interrupting circuit in GFI 17 functions to cause interruption of circuit breaker CBT as described in the aforementioned application Ser. No. 345,731.

Figure 3:
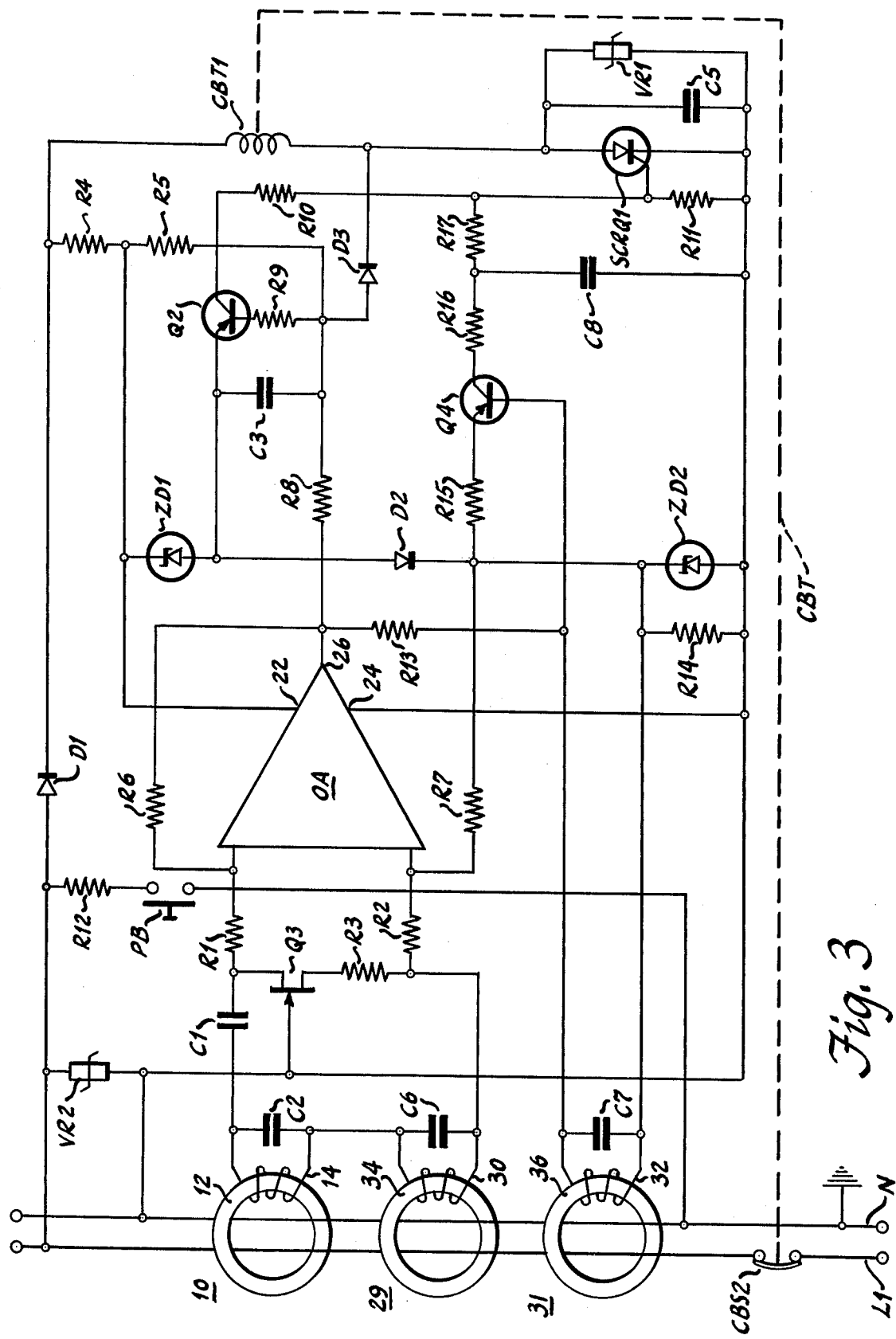
FIG. 3 is a diagram of a modified form on the invention.

FIG. 3 depicts a modified form of the invention as combined with a preferred form of circuitry for the ground fault interrupter 17 of FIG. 2 as disclosed in the aforementioned Van Zeeland et al., application Ser. No. 345,731. Corresponding elements in FIG. 3 are given the same reference numerals found in FIG. 1 of the Van Zeeland application which should be referred to for a complete understanding of how such ground fault interrupter functions when a line L1 to ground fault occurs.

In addition, as shown in FIG. 2 the circuitry includes differential transformers 29 and 31 which correspond respectively to transformer 19 and 25 of FIGS. 1 and 2 of this application. The lower end of secondary winding 14 of transformer 10 is connected to the upper end of that secondary winding 30 of transformer 29. A capacitor C6 is connected across winding 30 and the lower of the latter is connected in series with resistor R2 to the non-inverting input terminal 18 of operational amplifier OA.

The secondary winding 32 of transformer 31 has a capacitor C7 connected thereacross and its upper end is connected directly to the base electrode of a P-N-P transistor Q4, and is also connected in series with a resistor R13 to the output terminal 26 of amplifier OA. The lower end of winding 32 is connected to the point common between resistor R7, diode D2 and zener diode ZD2, and to line N in series with a resistor R14. The emitter of transistor Q4 is connected in series with a resistor R15 to the point common between resistor R7, diode D2, zener diode ZD2 and the collector of Q4 is connected in series with resistors R16 and R17 to the point common between resistor R10, resistor R11, and the control electrode of silicon controlled rectifier SCRQ1. A capacitor C8 is connected from the point common between resistors R16 and R17 to line N.

In the preferred embodiment of FIG. 3 the number of turns in secondary windings 30 and 32 is preferably 130, and the cores 34 and 36 are preferably formed from a ferrite material of medium permeability. The values of each of the capacitors C6 and C7 is 0.1 and the parallel combination of each of such secondary windings and its associated capacitor has a resonant frequency approximately of 4 KHz. The transformer 10 preferably has its core 12 formed from a Supermalloy type material providing high permeability and its secondary winding is preferably 1,000 turns. This provides that the parallel combination of winding 14 and capacitor C2 will have resonant frequency of approximately 60 Hz.

It will be appreciated that when fault from line L1 to ground occurs that transformer 10 will function in conjunction with amplifier OA, and transistor Q2, to successively energize SCRQ1 and winding CBT1 of the circuit breaker as described in the Van Zeeland et al application. As current induced in secondary winding 14 will be 60 Hz in frequency, winding 30 will afford low impedance to the flow of current to the non-inverting input terminal 18 of amplifier OA. The tank circuits 30-C6 and 32-C7 of transformers 29 and 31 will be insensitive to 60 Hz frequency current and will thus be passive whenever line L1 to ground faults occur.

When a neutral line N to ground fault occurs with a resistance in the range of 0 to 4 ohms, the line N as aforedescribed provides a link between the cores 34 and 36 of transformers 29 and 31 to sustain oscillatory current generated in the tank circuits 30-C6 and 32-C7. Accordingly, the inverting and non-inverting input terminals, 16 and 18 of amplifier OA are subjected to a 4K Hz A.C. potential of increasing amplitude. The output potential of amplifier OA will be alternating and correspondingly increase. Such output potential will through resistor R13 be imposed on the tank circuit 32-C7 of transformer 31 which through the link of line N with transformer 29 will sustain the oscillator current.

The base of Q4 will also be subjected to the increasing alternating potential output from amplifier OA. As a result Q4 conducts alternating current of increasing amplitude through its emitter-collector circuit which flows through resistor R16 into capacitor C8 to line N. Capacitor C8 acts as an integrating capacitor, and when its charge potential reaches a predetermined value it will cause SCRQ1 to conduct by virtue of the connection of capacitor C8 through resistor R17 to the gate of SCRQ1. Conduction of SCRQ1 as aforedescribed results in energization of winding CBT1 and opening of contacts CBS2 of the circuit breaker CBT.

As will be observed that when 4K Hz A.C. current is generated in the tank circuit 30-C6 and flows into the non-inverting input terminal 18 of amplifier OA, its circuit path is then through capacitor C2 of the tank circuit 14-C2 of transformer 10, as the latter will afford a low impedance path at this high frequency.

Figure 4:
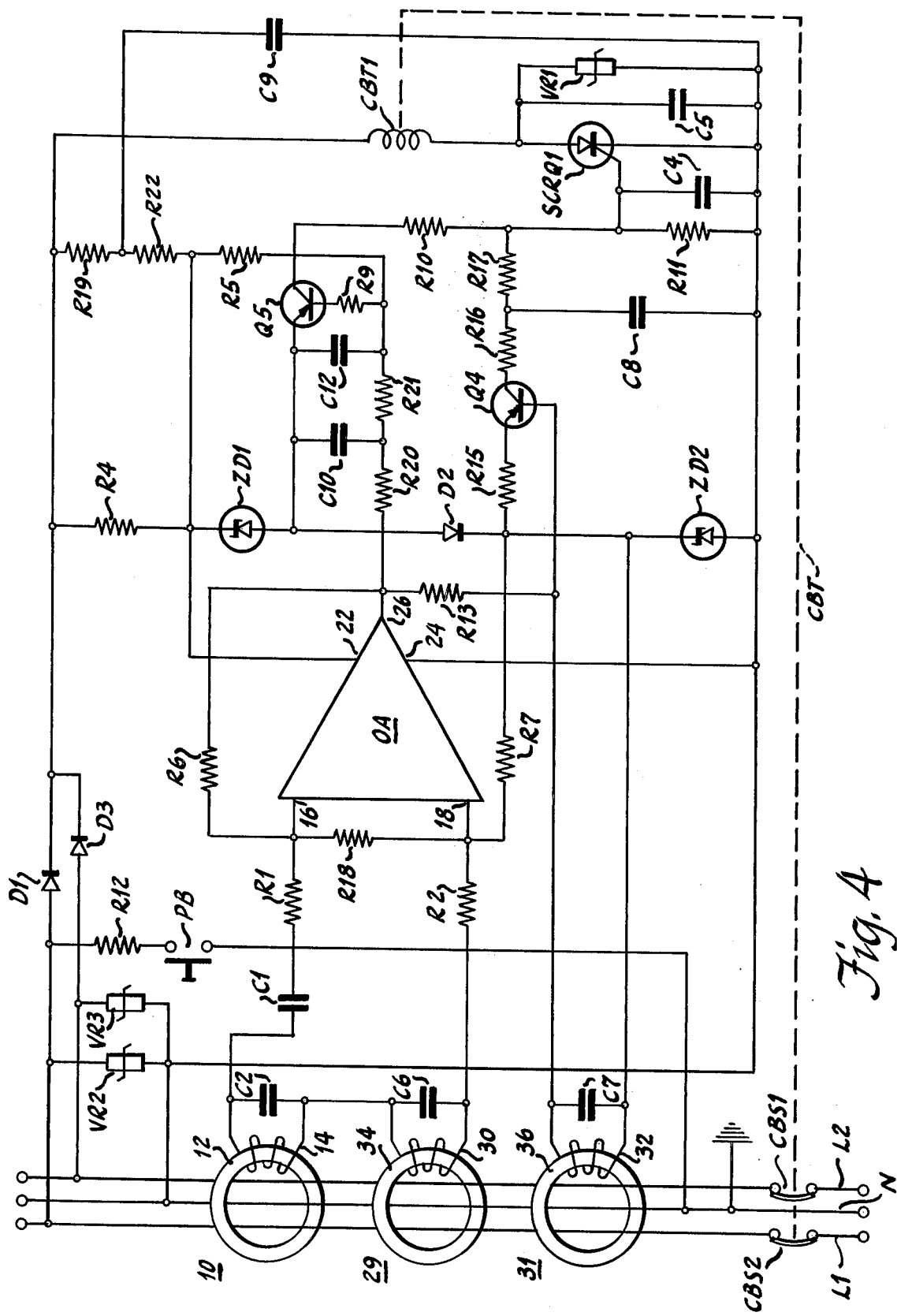
FIG. 4 is a diagram of still another modified form of the invention.

FIG. 4 discloses another preferred embodiment of the invention in combination with a line to ground fault interrupter as applied to a single phase, three wire, grounded neutral A.C. distribution system. As shown the neutral wire designated N is grounded to earth and circuit breaker contacts CBS1 and CBS2 in each of the electrified A.C. lines L1 and L2 are opened whenever winding CBT is energized. Many of the circuit elements of the ground fault interrupter of FIG. 4 are the same as those of FIG. 2 and have been given corresponding reference numbers.

It will be noted that in the embodiment of FIG. 4 that the field effect transistor Q3 and resistor R3 of FIG. 3, have been omitted. Instead a resistor R18 is connected across the non-inverting and inverting input terminal 16 and 18 of amplifier OA. D.C. potential is supplied from lines L1 and L2 being through diodes D1 and D3 that have their cathodes connected in circuit with the upper end of resistor R4, and in series with a resistor R19 and a smoothing capacitor C9 to ground through line N. In place of transistor Q2 of FIG. 3, a P-N-P transistor Q5 is used, and is provided with a filter network comprising resistors R20 and R21 connected between the output terminal 26 of amplifier OA and its base resistor R9, and capacitors C10 and C12 connected in parallel between the emitter of Q5 and the points common between resistors R20-R21 and R21-R9 as shown. The point common between resistors R19 and capacitor C9 is connected in series with a resistor R22 and resistor R5 to the point common between resistors R9 and R21 and capacitor C12. Varistors VR2 and VR3 are connected across each of the lines L1 and L2 to line N.

With no ground faults existing between either of the lines L1 or L2 and ground, amplifier OA will have a quiescent D.C. output potential of approximately 10 volts. The base of Q5 will be at approximately 11.7 volts and accordingly Q5 will be biased off. The aforementioned filter network comprising resistors R20, R21 and capacitors C10 and C12 act as a low pass filter and thus render the base of transistor Q5 insensitive to high frequency alternating type noise that might otherwise tend to render it conducting. Whenever a ground fault from either lines L1 or L2 to ground occurs, amplifier OA will provide an alternating output of an amplitude sufficient to render Q5 conducting which in turn triggers SCRQ1 into conduction to energize winding CBT which in turn opens the circuit breaker contacts CBS1 and CBS2. When a ground fault occurs between neutral line N and ground, transformers 29 and 31, and amplifier OA functions as aforedescribed in conjunction with FIG. 3 to render Q4 and SCRQ1 successively conducting.

It will be apparent to those skilled in the art that other forms of amplification and detector circuitry may be employed without departing from the basic concepts and scope of the present invention.

We claim:

1. In a ground fault interrupter for an alternating current distribution circuit which has a neutral electrically grounded conductor and at least one electrified conductor, of an electro-responsive circuit breaker having contacts for connection between each electrified conductor of an alternating circuit supply source and corresponding conductors of said distribution circuit, normally dormant means responsive to a low resistive fault between said neutral conductor and ground to initiate generation of a high frequency oscillatory potential and means responsive to the resulting oscillatory current to effect energization of said electro-responsive circuit breaker.

2. The combination according to claim 1 wherein said normally dormant means comprises amplifying means and two differential transformers each having cores through which the conductors of said distribution circuit pass and a secondary winding in circuit with said amplifying means.

3. The combination according to claim 2 wherein said amplifying means includes an operational amplifier, wherein secondary winding of one of said transformers has a capacitor connected thereacross and is connected to the input terminals of said amplifier, and wherein the secondary winding of the other of said transformers has a capacitor connected thereacross and is in circuit with the output of said operational amplifier.

4. The combination according to claim 3 wherein the inductance of said secondaries and the capacitance of the capacitors connected thereacross provide a pair of high frequency resonant tank circuits that are insensitive to normal distribution circuit frequencies.

5. The combination according to claim 3 together with a third differential transformer having a core through which the conductors of said distribution circuit pass and a secondary winding in circuit with the input terminals of said operational amplifier and a capacitor connected across the last mentioned secondary winding, said last mentioned secondary winding and capacitor having inductance and capacitance values such that an alternating potential will be generated in their parallel combination when a fault occurs between any electrified line and ground at the distribution circuit frequency.

6. The combination according to claim 3 wherein the cores and secondary windings of said transformers upon occurance of a neutral conductor to ground fault are thereby effectively coupled by said neutral conductor and the fault established ground return path to initiate and sustain the generation of said high frequency oscillatory current, and wherein the gain of the circuit inclusive of said coupled secondary windings of said transformers and said amplifier is equal to or greater than unity.

* * * * *